United States Patent
Shao et al.

(10) Patent No.: US 11,383,165 B2
(45) Date of Patent: Jul. 12, 2022

(54) IN-GAME DISPLAY CONTROL METHOD AND APPARATUS, STORAGE MEDIUM, PROCESSOR, AND TERMINAL

(71) Applicant: NETEASE (HANGZHOU) NETWORK CO., LTD., Zhejiang (CN)

(72) Inventors: Kun Shao, Zhejiang (CN); Zheng Jin, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/642,011

(22) PCT Filed: May 10, 2019

(86) PCT No.: PCT/CN2019/086460
§ 371 (c)(1),
(2) Date: Feb. 25, 2020

(87) PCT Pub. No.: WO2020/143144
PCT Pub. Date: Jul. 16, 2020

(65) Prior Publication Data
US 2021/0339138 A1    Nov. 4, 2021

(30) Foreign Application Priority Data
Jan. 10, 2019 (CN) .......................... 201910024667.8

(51) Int. Cl.
*A63F 13/537* (2014.01)
(52) U.S. Cl.
CPC .................... *A63F 13/537* (2014.09)
(58) Field of Classification Search
CPC ...................................................... A63F 13/537
See application file for complete search history.

(56) References Cited

U.S. PATENT DOCUMENTS

| | | | |
|---|---|---|---|
| 2009/0143141 A1* | 6/2009 | Wells | .................. G07F 17/3237 |
| | | | 463/37 |
| 2009/0289900 A1* | 11/2009 | Lavski | ..................... A63F 13/06 |
| | | | 345/173 |

(Continued)

FOREIGN PATENT DOCUMENTS

| | | |
|---|---|---|
| CN | 106598465 A | 4/2017 |
| CN | 107596688 A | 1/2018 |

(Continued)

OTHER PUBLICATIONS

Iqbf.com, "football game, large 37 inches IR touch screen, android box from iqbf.com", May 2, 2016 at (https://www.youtube.com/watch?v=FzwvyBUa4VY), pp. 1-7, (last visited Aug. 25, 2021) (Year: 2016).*
SoloCrowdApps, "Gyro Archer—Mobile Game", Aug. 16, 2014, at (https://www.youtube.com/watch?v=gZACAvLkTas), pp. 1-7, (last visited Aug. 25, 2021) (Year: 2014).*

(Continued)

*Primary Examiner* — Steve Rowland
(74) *Attorney, Agent, or Firm* — Gang Yu

(57) ABSTRACT

An in-game display control method and apparatus, a storage medium, a processor, and a terminal are provided. The method includes: a first touch area and a second touch area are configured on a graphical user interface; in response to a first touch operation acting on the first touch area, a movement of a first virtual character in a game scene is controlled according to the first touch operation; a scene display area in the game scene is updated according to a position of the first virtual character in the game scene; and in response to a preset skill release operation acting on the second touch area, the scene display area in the game scene is updated at least according to a skill release direction corresponding to the preset skill release operation.

18 Claims, 4 Drawing Sheets

(56) References Cited

U.S. PATENT DOCUMENTS

| | | | |
|---|---|---|---|
| 2010/0321319 A1* | 12/2010 | Hefti | G06F 3/04883 345/173 |
| 2011/0107268 A1* | 5/2011 | Scherk | G06F 9/451 715/845 |
| 2012/0021833 A1* | 1/2012 | Boch | A63F 13/213 463/36 |
| 2013/0185636 A1* | 7/2013 | Lim | G06F 3/03547 715/716 |
| 2014/0098050 A1* | 4/2014 | Endo | G06F 3/0487 345/173 |
| 2015/0135108 A1* | 5/2015 | Pope | G06F 3/0484 715/767 |
| 2017/0092038 A1* | 3/2017 | Vann | G07F 17/3286 |

FOREIGN PATENT DOCUMENTS

| | | |
|---|---|---|
| CN | 107823882 A | 3/2018 |
| CN | 107913520 A | 4/2018 |
| CN | 107982918 A | 5/2018 |
| CN | 108196765 A | 6/2018 |
| CN | 108310768 A | 7/2018 |
| CN | 109675308 A | 4/2019 |

OTHER PUBLICATIONS

Wei's Commentary <<The King of Glory>—What happened if Li Bai use Han Xin's skill?>> https://tv.sohu.com/v/dXMvMjg5NzY1NTYxLzEwMDYyNDQ5NS5zaHRtbA==html. Apr. 5, 2018 ; From 0:00 to 2:23.

* cited by examiner

IN-GAME DISPLAY CONTROL METHOD AND APPARATUS, STORAGE MEDIUM, PROCESSOR, AND TERMINAL

CROSS-REFERENCE TO RELATED APPLICATIONS

The present disclosure claims priority of Chinese Patent Application No. 201910024667.8, filed to China Patent Office on Oct. 1, 2019. Contents of the present disclosure are hereby incorporated by reference in entirety of the Chinese Patent Application.

TECHNICAL FIELD

The present disclosure relates to the field of computers, and in particular to an in-game display control method and apparatus, a storage medium, a processor, and a terminal.

BACKGROUND

At present, in mainstream Multiplayer Online Battle Arena (MOBA) mobile games, game scenes are usually observed by a basic manner of fixed lens and lens dragging. In addition, some games will carry out targeted lens interaction design for a few specific types of heroic characters based on the basic manner of fixed lens and lens dragging. Or, some games will also carry out supplementary design in terms of specific lenses. For example, game players may manually switch a lens height mode.

The fixed lens means that a center of the lens is fixed on the body of a game character model by default, and a height of the lens is a fixed value by default. A game player may move a camera by clicking and dragging on a specific area of a screen, and a drag speed of the virtual camera is different in different types of games. In some MOBA mobile games, the longest drag distance may reach ¼ of the maximum battlefield length. In another part of the MOBA mobile games, the longest drag distance may reach almost the entire battlefield.

In addition, when a game player clicks on a mini map in a user interface, the virtual camera will be immediately moved to the clicked position; and when the game player continuously performs a dragging operation after performing the clicking operation, the virtual camera will also follow the movement until the game player releases the hand, and the virtual camera will automatically return to an initial position of this camera.

However, the above lens interaction design has the following technical defects.

At one, since the maximum cast range of at least one remote skill of a hero character is usually set based on a one-screen distance (the one-screen distance refers to a physical size of a hardware screen of a mobile terminal, which will change with the type and model of the mobile terminal) as a standard, so when releasing such skills, the hero character cannot observe the surrounding situation of the targeted position in time.

At two, blocked positions in the upper left area (for example, a mini map area) and lower right area (for example, a skill control setting area) on a game interface will make the hero character lose horizon, and when a game player releases skills to the blocked positions, it is often necessary to drag perspective to achieve precise release of skills.

Based on the above analysis, in the current MOBA mobile games on the market, due to limitation of a two-handed interaction mode, most of the games use a fixed lens and lens dragging solution to meet demands of game players for battlefield horizon and lens operations. However, according to the above analysis, it can be known that this solution combining a fixed lens and an active dragging lens can meet the most basic functional requirements, lacks favorable adaptability and scalability for special situations and operations that occur in the game, and cannot meet game experience needs of game players at different levels.

As to the problem mentioned above, no effective solution has been provided yet.

SUMMARY

At least some embodiments of the present disclosure provide an in-game display control method and apparatus, a storage medium, a processor, and a terminal, so as at least to partially solve a technical problem that an adjustment mode of an in-game virtual lens provided in the related art has a single operation mode, lacks favorable adaptability and scalability, and cannot meet game experience requirements of game players at different levels.

In an embodiment of the present disclosure, an in-game display control method is provided. This method is applied to a mobile terminal having at least one processor for executing a software application and a touch screen which is rendered with a graphical user interface. A game scene of a game may include a first virtual character and a scene display area. The scene display area may be at least part of the game scene. Contents rendered on the graphical user interface may include the scene display area. The method may include that:

a first touch area and a second touch area are configured on a graphical user interface; in response to a first touch operation acting on the first touch area, a movement of the first virtual character in the game scene is controlled according to the first touch operation; the scene display area in the game scene is updated according to a position of the first virtual character in the game scene; and in response to a preset skill release operation acting on the second touch area, the scene display area in the game scene is updated at least according to a skill release direction corresponding to the preset skill release operation.

Optionally, the operation that the scene display area in the game scene at least according to the skill release direction corresponding to the preset skill release operation may include that: an update direction of the scene display area in the game scene is determined according to the skill release direction corresponding to the preset skill release operation, and the scene display area is updated in the game scene along the update direction.

Optionally, a virtual camera corresponding to the first virtual character may be configured in the game scene, and the scene display area in the game scene may be an area shot by the virtual camera.

Optionally, the operation that the scene display area in the game scene is updated at least according to the skill release direction corresponding to the preset skill release operation may include that: an adjustment direction of the virtual camera is determined according to the release direction; a movement of the virtual camera is controlled according to the adjustment direction; and the scene display area in the game scene is updated according to the movement of the virtual camera.

Optionally, the operation that the scene display area in the game scene at least according to the skill release direction corresponding to the preset skill release operation may include that: the scene display area in the game scene is updated according to the skill release direction and at least one skill attribute corresponding to the preset skill release operation, the at least one skill attribute including an effect area of a skill release.

Optionally, the operation that the scene display area in the game scene is updated at least according to the skill release direction and the at least one skill attribute corresponding to the preset skill release operation may include that: an adjustment direction of the virtual camera is determined according to the release direction; an adjustment position of the virtual camera is determined according to the at least one skill attribute; the movement of the virtual camera is controlled according to the adjustment direction and the adjustment position; and the scene display area in the game scene is updated according to the movement of the virtual camera.

Optionally, the method may further include that: a second touch operation acting on a preset position of the graphical user interface is detected; and according to the second touch operation, the scene display area is controlled to restore to a state before performing the preset skill release operation.

Optionally, the method may further include that: when the skill release operation ends, the scene display area is controlled to restore to a state before performing the preset skill release operation.

Optionally, the operation that the scene display area in the game scene is updated at least according to the skill release direction corresponding to the preset skill release operation may include that: the skill release direction is determined according to an operation direction of the preset skill release operation; and the scene display area in the game scene is updated according to the skill release direction.

Optionally, the operation that the scene display area in the game scene is updated at least according to the skill release direction corresponding to the preset skill release operation may include that: a skill release position is determined according to an operation track of the preset skill release operation; the skill release direction is determined according to the skill release position and the position of the first virtual character; and the scene display area in the game scene is updated according to the skill release direction.

Optionally, the operation that the scene display area in the game scene is updated at least according to the skill release direction corresponding to the preset skill release operation may include that: a position of a second virtual character in a preset range of the first virtual range is acquired; the skill release direction is determined according to the preset skill release operation, the position of the first virtual character and the position of the second virtual character; and the scene display area in the game scene is updated according to the skill release direction.

In another embodiment of the present disclosure, an in-game display control apparatus is further provided. This apparatus is applied to a mobile terminal having at least one processor for executing a software application and a touch screen which is rendered with a graphical user interface. A game scene of a game may include a first virtual character and a scene display area. The scene display area may be at least part of the game scene, and contents rendered on the graphical user interface may include the scene display area. The apparatus may include: a configuration component, configured to configure a first touch area and a second touch area on the graphical user interface; a control component, configured to, in response to a first touch operation acting on the first touch area, control a movement of the first virtual character in the game scene according to the first touch operation; a first update component, configured to update the scene display area in the game scene according to a position of the first virtual character in the game scene; and a second update component, configured to, in response to a preset skill release operation acting on the second touch area, update the scene display area in the game scene at least according to a skill release direction corresponding to the preset skill release operation.

Optionally, the second update component may be configured to determine an update direction of the scene display area in the game scene according to the skill release direction corresponding to the preset skill release operation, and update the scene display area in the game scene along the update direction.

Optionally, a virtual camera corresponding to the first virtual character may be configured in the game scene, and the scene display area in the game scene may be an area shot by the virtual camera.

Optionally, the second update component may include: a first determination element, configured to determine an adjustment direction of the virtual camera according to the release direction; a first control element, configured to control a movement of the virtual camera according to the adjustment direction; and a first update element, configured to update the scene display area in the game scene according to the movement of the virtual camera.

Optionally, the second update component may be configured to update the scene display area in the game scene according to the skill release direction and at least one skill attribute corresponding to the preset skill release operation, the at least one skill attribute including an effect area of a skill release.

Optionally, the second update component may include: a second determination element, configured to determine an adjustment direction of the virtual camera according to the release direction; a third determination element, configured to determine an adjustment position of the virtual camera according to the at least one skill attribute; a second control element, configured to control the movement of the virtual camera according to the adjustment direction and the adjustment position; and a second update element, configured to update the scene display area in the game scene according to the movement of the virtual camera.

Optionally, the apparatus may further include: a detection component, configured to detect a second touch operation acting on a preset position of the graphical user interface; and a second control component, configured to control, according to the second touch operation, the scene display area to restore to a state before performing the preset skill release operation.

Optionally, the apparatus may further include: a third control component, configured to, when the skill release operation ends, control the scene display area to restore to a state before performing the preset skill release operation.

Optionally, the second update component may include: a fourth determination element, configured to determine the skill release direction according to an operation direction of the preset skill release operation; and a third update element, configured to update the scene display area in the game scene according to the skill release direction.

Optionally, the second update component may include: a fifth determination element, configured to determine a skill release position according to an operation track of the preset skill release operation; a sixth determination element, configured to determine the skill release direction according to the skill release position and the position of the first virtual character; and a fourth update element, configured to update the scene display area in the game scene according to the skill release direction.

Optionally, the second update component may include: an acquisition element, configured to acquire a position of a second virtual character in a preset range of the first virtual range; a seventh determination element, configured to determine the skill release direction according to the preset skill release operation, the position of the first virtual character and the position of the second virtual character; and a fifth update element, configured to update the scene display area in the game scene according to the skill release direction.

In another embodiment of the present disclosure, a storage medium is further provided, which may include a stored program. When the program is run, a device where the storage medium is located may be controlled to perform the in-game display control method as mentioned above.

In another embodiment of the present disclosure, a processor is further provided. The processor may be configured to run a program. When the program is run, the in-game display control method as mentioned above may be performed.

In another embodiment of the present disclosure, a terminal is also provided. The terminal may include at least one processor, a memory, a display device and at least one program. The at least one program may be stored in the memory, and configured to be executed by the at least one processor. The at least one processor may be configured to perform the in-game display control method as mentioned above.

Through at least some embodiments of the present disclosure, the first touch area and the second touch area are configured on the graphical user interface, in response to the first touch operation acting on the first touch area, the movement of the first virtual character in the game scene is controlled according to the first touch operation, the scene display area in the game scene is updated according to the position of the first virtual character in the game scene, and through the preset skill release operation acting on the second touch area, the scene display area in the game scene is updated at least according to a skill release direction corresponding to the preset skill release operation, thereby achieving an auxiliary aim of automatically adjusting the scene display area in the game scene according to the skill release direction corresponding to the preset skill release operation executed by a game player. Therefore, a technical effect of realizing an intelligent scene display area adjustment mode to make an adjustment operation of an in-game scene display area more flexible and intelligent to adapt to the demands of game players at different levels is achieved, thereby solving the technical problem that the adjustment mode of the in-game virtual lens provided in the related art has the single operation mode, lacks favorable adaptability and scalability, and cannot meet the game experience requirements of game players at different levels.

BRIEF DESCRIPTION OF THE DRAWINGS

The accompanying drawings described herein are used for providing a further understanding of the present disclosure, and constitute a part of the present application, and the exemplary embodiments of the present disclosure and the description thereof are used for explaining the present disclosure, but do not constitute improper limitations to the present disclosure. In the drawings.

DETAILED DESCRIPTION

Figure 1:
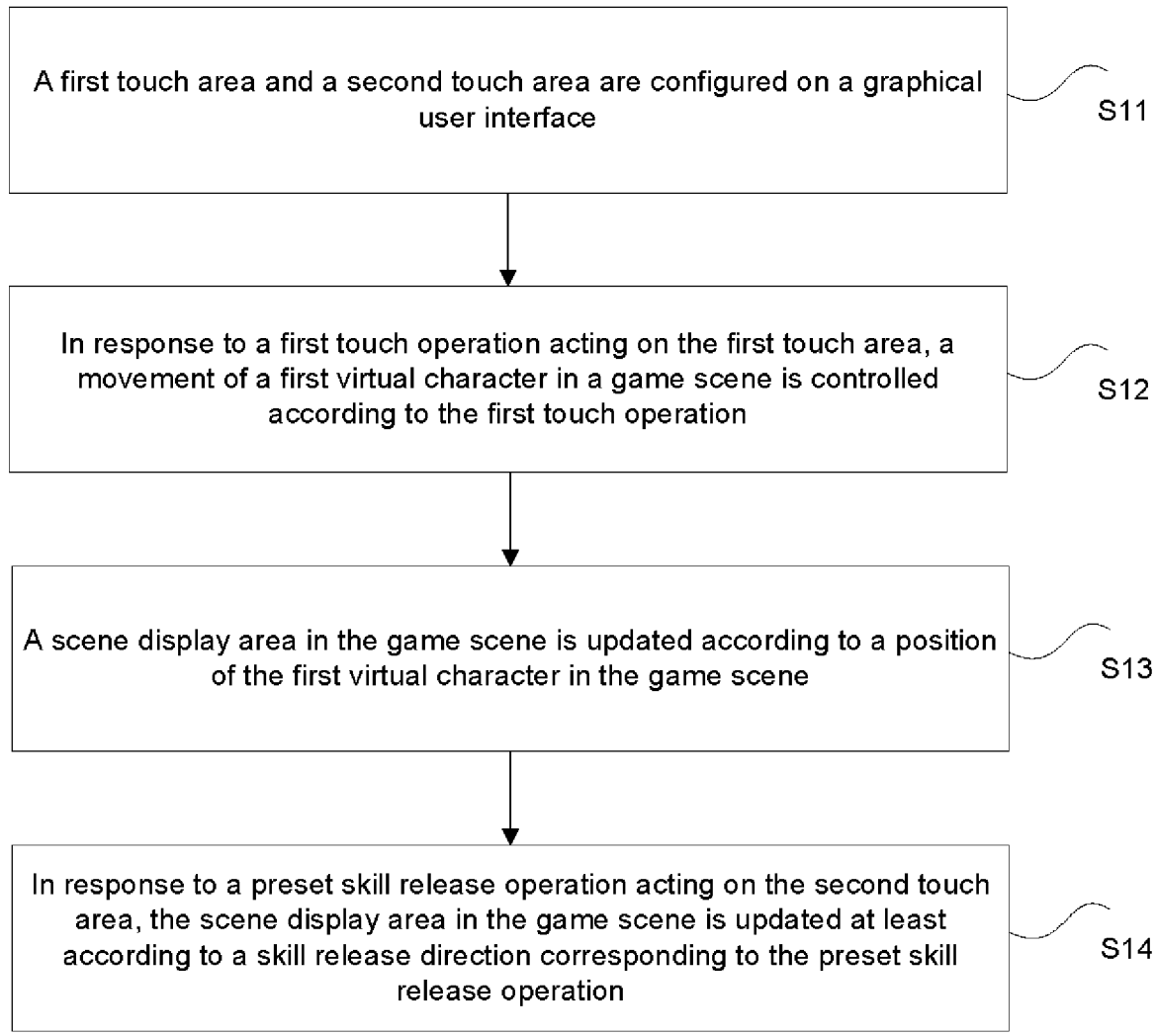
FIG. 1 is a flowchart of an in-game display control method according to an embodiment of the present disclosure.

In order to make those skilled in the art better understand the solutions of the present disclosure, technical solutions in embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used for distinguishing similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In an embodiment of the present disclosure, an in-game display control method is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The method embodiment may be implemented in a mobile terminal, a computer terminal or a similar computing device. Running on the mobile terminal is taken as an example. The mobile terminal may include at least one processor (the at least one processor may include but is not limited to a processing device such as a Central Processing Unit (CPU), a Graphics Processing Unit (GPU), a Digital Signal Processing (DSP) chip, a Micro Controller Unit (MCU) or a Field Programmable Gate Array (FPGA)) and a memory configured to store data. Optionally, the mobile terminal may further include a transmission apparatus and an input/output device for communication functions. Those skilled in the art can understand that the above structure is merely illustrative, and does not limit the structure of the above mobile terminal. For example, the mobile terminal may further include more or less components than those described in the above structure, or have a configuration different from that described above.

The memory may be configured to store a computer program, for example, a software program and component of application software, such as a computer program corresponding to the in-game display control method in the embodiment of the present disclosure, and the processor executes various functional applications and data processing by running the computer program stored in the memory, that is, implements the above in-game display control method. The memory may include a high speed random access memory and may also include a non-volatile memory such as at least one magnetic storage device, a flash memory, or other non-volatile solid state memories. In some examples, the memory may further include memories remotely located relative to the processor, which may be connected to the mobile terminal over a network. The examples of such networks include, but are not limited to, the Internet, the Intranet, local area networks, mobile communication networks, and combinations thereof.

The transmission device is configured to receive or send data via a network. The above specific network example may include a wireless network provided by a communication provider of the mobile terminal. In one example, the transmission device includes a Network Interface Controller (NIC) that may be connected to other network devices through a base station to communicate with the Internet. In one example, the transmission device may be a Radio Frequency (RF) component for communicating with the Internet wirelessly.

An in-game display control method running on the mobile terminal is provided in the present embodiment. This method is applied to a mobile terminal having at least one processor for executing a software application and a touch screen which is rendered with a graphical user interface. A game scene of a game includes a first virtual character and a scene display area. The scene display area is at least part of the game scene. Contents rendered on the graphical user interface include the scene display area. FIG. 1 is a flowchart of an in-game display control method according to an embodiment of the present disclosure. As shown in FIG. 1, the method includes the following steps.

At step S11, a first touch area and a second touch area are configured on the graphical user interface.

At step S12, in response to a first touch operation acting on the first touch area, a movement of the first virtual character in the game scene is controlled according to the first touch operation.

At step S13, the scene display area in the game scene is updated according to a position of the first virtual character in the game scene.

At step S14, in response to a preset skill release operation acting on the second touch area, the scene display area in the game scene is updated at least according to a skill release direction corresponding to the preset skill release operation.

By means of the above steps, the first touch area and the second touch area are configured on the graphical user interface, in response to the first touch operation acting on the first touch area, the movement of the first virtual character in the game scene is controlled according to the first touch operation, the scene display area in the game scene is updated according to the position of the first virtual character in the game scene, and through the preset skill release operation acting on the second touch area, the scene display area in the game scene is updated at least according to a skill release direction corresponding to the preset skill release operation, thereby achieving an auxiliary aim of automatically adjusting the scene display area in the game scene according to the skill release direction corresponding to the preset skill release operation executed by a game player. Therefore, a technical effect of realizing an intelligent scene display area adjustment mode to make an adjustment operation of an in-game scene display area more flexible and intelligent to adapt to the demands of game players at different levels is achieved, thereby solving the technical problem that the adjustment mode of the in-game virtual lens provided in the related art has the single operation mode, lacks favorable adaptability and scalability, and cannot meet the game experience requirements of game players at different levels.

It is to be noted that the operation of controlling the movement of the first virtual character in the game scene through the first touch operation to update the scene display area in the game scene described at step S12 to step S13 does not have a strict timing relationship with the operation of updating the scene display area in the game scene at least according to the skill release direction corresponding to the preset skill release operation described at step S14. In other words, the update scene display area described at step S14 may occur before updating the scene display area described at step S12 to step S13, or may occur after updating the scene display area described at step S12 to step S13, or may, of course, occur while updating the scene display area described at step S12 to step S13. That is, while releasing the skills, it will not affect the movement of a virtual character. For example, while controlling, by a game player, a virtual character to release skills, chasing an enemy virtual character is kept. Of course, while the movement of the virtual character is controlled, the release of skills will not be affected. For example, the virtual character is controlled, by the game player, to release specific skills during the jumping process. Therefore, it is not strictly limited in the embodiments of the present disclosure.

The first touch area may be a direction control located on a lower left area of the graphical user interface. The second touch area may be a skill control located on a lower right area of the graphical user interface.

In the related art, when a game player controls a first virtual character to release a specific skill, a current scene display area does not change with a skill release direction, which may cause the game player to fail to accurately attack an enemy virtual character or reasonably select an attack object since the game player cannot obtain a favorable horizon. On the contrary, through the technical solution provided by this embodiment of the present disclosure, the scene display area in the game scene may be updated at least according to the skill release direction corresponding to the preset skill release operation, so that the game player can obtain a better horizon, thereby accurately performing at least one the following operation: attacking the enemy virtual character and reasonably selecting the attack object.

Optionally, at step S14, the operation that the scene display area in the game scene is updated at least according to the skill release direction corresponding to the preset skill release operation may include the following execution steps.

At step S1401, an update direction of the scene display area in the game scene is determined according to the skill release direction corresponding to the preset skill release operation, and the scene display area is updated in the game scene along the update direction.

A directional skill for a virtual character has a skill indicator on the graphical user interface. The direction indicated by the skill indicator usually points to an attack direction from a current location of the virtual character. The skill indicator is configured to indicate an actual attack range of each skill of the virtual character. The shape of the skill indicator may include, but is not limited to, an arrow shape and a circle shape. When the game player performs a preset skill release operation by aiming at an enemy virtual character, the update direction of the scene display area in the game scene may be determined through the skill release direction. The update direction will cause the scene display area to shift, and a shift process is consistent with a movement process of the skill indicator. That is, contents rendered on the scene display area may be updated in the game scene along the update direction.

Optionally, a virtual camera corresponding to the first virtual character is configured in the game scene, and the scene display area in the game scene is an area shot by the virtual camera.

In an optional embodiment, the virtual camera may be fixed on the first virtual character controlled by the game player, move according to the movement of the virtual character, and rotate according to the rotation of the virtual character, which is similar to a subjective perspective of the virtual character. Therefore, the scene display area in the game scene is an area shot by the virtual camera. Of course, the virtual camera may also be set at a position relative to the first virtual character controlled by the game player, for example, set at a preset position above the first virtual character and follow the virtual character to move, which is similar to a third party's perspective relative to the virtual character. Therefore, the scene display area in the game scene is an area shot by the virtual camera. The following optional embodiments mainly take a virtual camera fixed at a relative position of a virtual character controlled by a game player as an example for detailed description. The implementation process is also applicable to setting the virtual camera on a virtual character controlled by a game player.

Optionally, at step S14, the operation that the scene display area in the game scene is updated at least according to the skill release direction corresponding to the preset skill release operation may include the following execution steps.

At step S1402, an adjustment direction of the virtual camera is determined according to the release direction.

At step S1403, a movement of the virtual camera is controlled according to the adjustment direction.

At step S1404, the scene display area in the game scene is updated according to the movement of the virtual camera.

Figure 2:
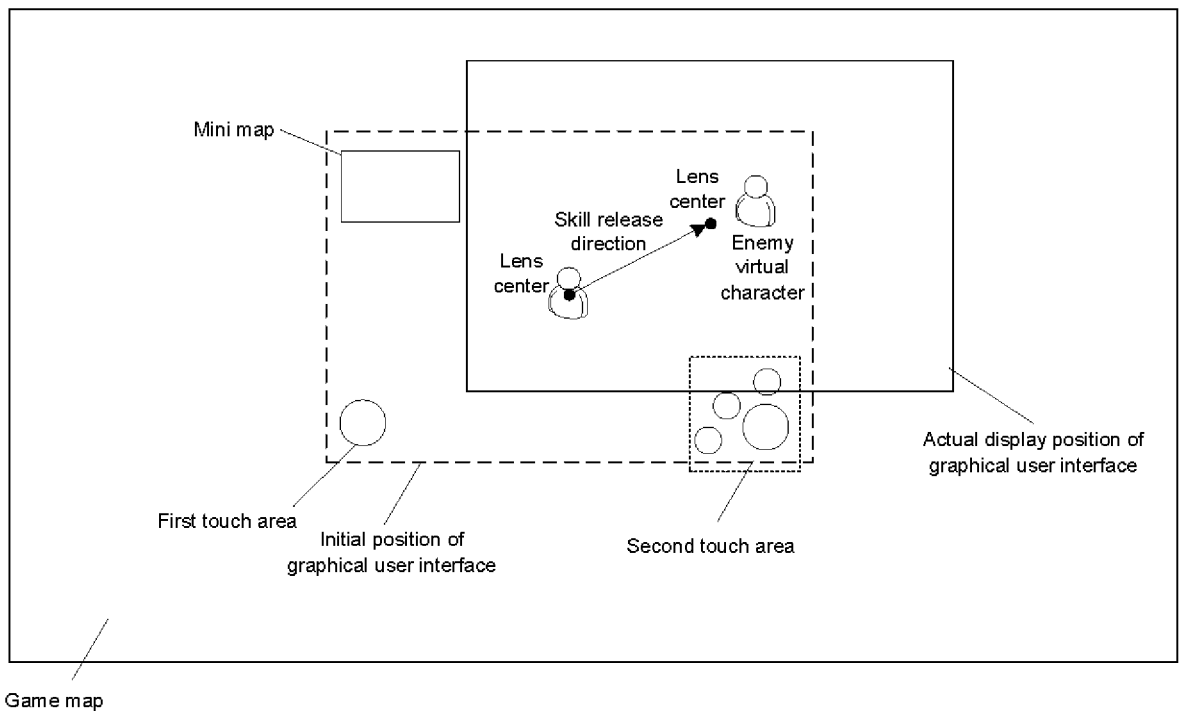
FIG. 2 is a schematic diagram of in-game display control according to a first exemplary embodiment of the present disclosure.

When the virtual camera corresponding to the first virtual character is configured in the game scene and the virtual camera is fixed on the virtual character controlled by the game player, the adjustment direction of the virtual camera may be determined through the skill release direction. FIG. 2 is a schematic diagram of in-game display control according to a first exemplary embodiment of the present disclosure. As shown in FIG. 2, according to the adjustment direction, the virtual camera is controlled to move along the skill release direction from the current location of the first virtual character. The movement mode is determined according to the effect of skill release. For example, when skills are continuously released from the virtual character controlled by a game player to the enemy virtual character, the virtual camera may be moved at a constant speed during the skill release process. For another example, when the skill release area is a specific area independent of the location of the virtual character, the movement of the virtual camera from the location of the virtual character to the specific area may be accelerated. Then, an area shot by the virtual camera, that is, the scene display area in the game scene, is updated according to the movement of the virtual camera.

Optionally, at step S14, the operation that the scene display area in the game scene is updated at least according to the skill release direction corresponding to the preset skill release operation may include the following execution steps.

At step S1405, the scene display area in the game scene is updated according to the skill release direction and at least one skill attribute corresponding to the preset skill release operation, the at least one skill attribute including an effect area of a skill release.

Figure 3:
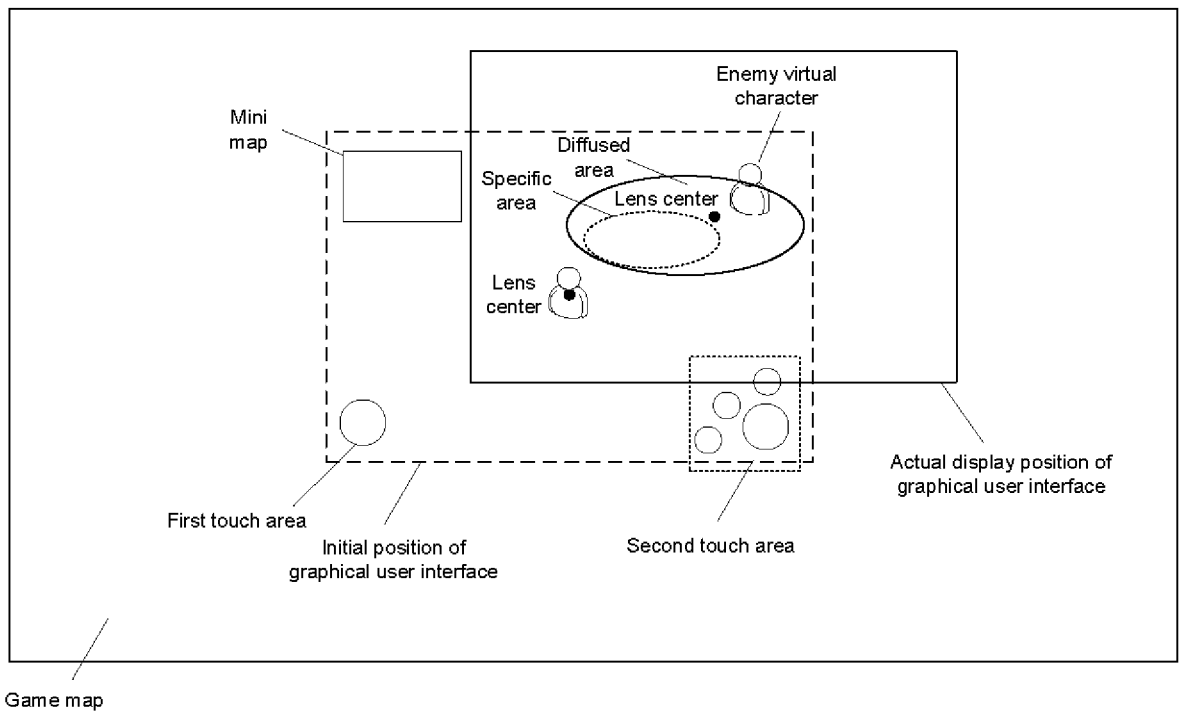
FIG. 3 is a schematic diagram of in-game display control according to a second exemplary embodiment of the present disclosure.

Considering that there are differences in skill indicators set by different virtual characters during the skill release process, based on the skill release direction corresponding to the preset skill release operation, it is necessary to further update the scene display area in the game scene according to the at least one skill attribute (including the effect area of a skill release). When the skill indicator set during the skill release of the first virtual character points from the current location of the virtual character to the skill release direction, the scene display area in the game scene may be updated by determining an update position or a shifting distance in a range between the current location of the first virtual character and a tail end of the skill indicator. When the skill indicator set during the skill release of the virtual character is, in a preset range centered by the current location of the virtual character, a specific area displayed in the preset range independent of the virtual character, the scene display area in the game scene also needs to be updated by determining an update position or a shifting distance in a range between the current location of the first virtual character and the tail end of the skill indicator. FIG. 3 is a schematic diagram of in-game display control according to a second exemplary embodiment of the present disclosure. As shown in FIG. 3, after the first virtual character releases a specific skill in the specific area, when the specific area continues to spread or extend in a direction away from the first virtual character subsequently with the release of other skills or the additional or derivative effect of the specific skill, it is necessary to continue to update the scene display area in the game scene. That is, the position of the virtual camera needs to be determined between the farthest end of the specific area and the current location of the first virtual character. After the specific area changes to a diffused area, the position of the virtual camera is determined between the farthest end of the diffused area and the current location of the first virtual character. At this time, it can be considered that the tail end of the skill indicator has changed, and the scene display area in the game scene needs to be updated again.

Optionally, at step S14, the operation that the scene display area in the game scene is updated at least according to the skill release direction and the at least one skill attribute corresponding to the preset skill release operation may include the following execution steps.

At step S1406, an adjustment direction of the virtual camera is determined according to the release direction.

At step S1407, an adjustment position of the virtual camera is determined according to the at least one skill attribute.

At step S1408, the movement of the virtual camera is controlled according to the adjustment direction and the adjustment position.

At step S1409, the scene display area in the game scene is updated according to the movement of the virtual camera.

When the virtual camera corresponding to the first virtual character is configured in the game scene and the virtual camera is fixed on the virtual character controlled by the game player, the adjustment direction of the virtual camera may be determined through the skill release direction. Then, according to the at least one skill attribute, the virtual camera is controlled to move in the range between the current location of the first virtual character and the tail end of the skill indicator, thereby determining the adjustment position of the virtual camera.

Figure 4:
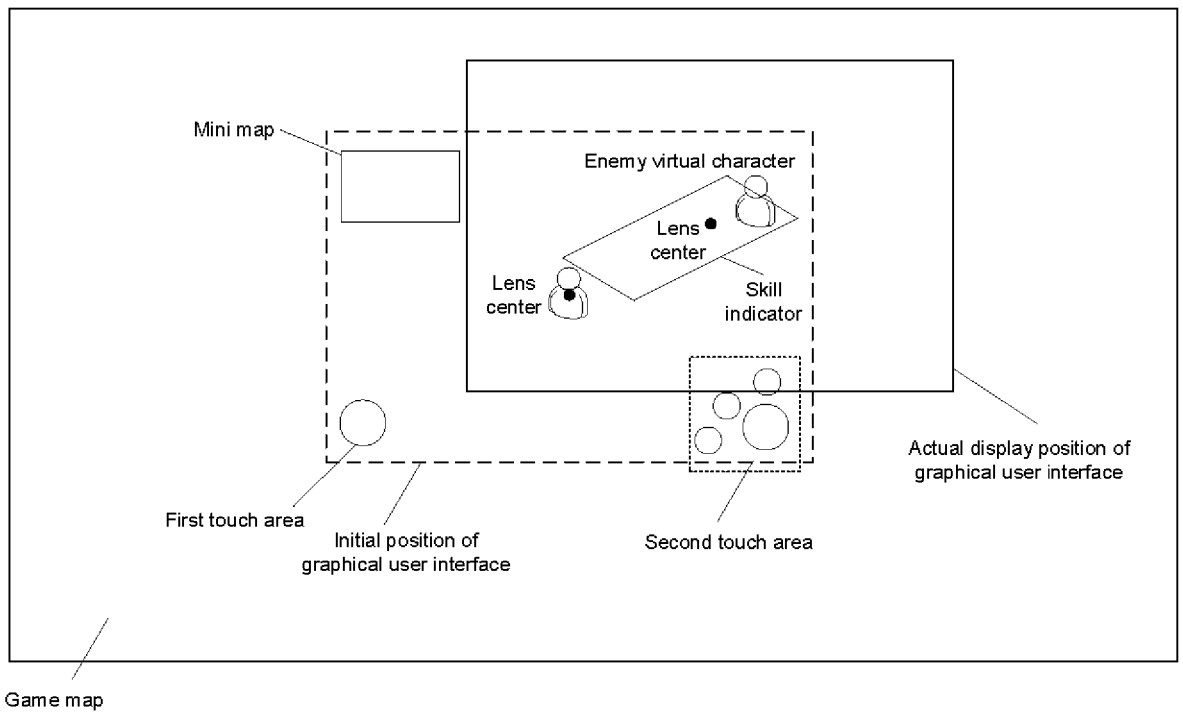
FIG. 4 is a schematic diagram of in-game display control according to a third exemplary embodiment of the present disclosure.

FIG. 4 is a schematic diagram of in-game display control according to a third exemplary embodiment of the present disclosure. As shown in FIG. 4, the tail end of the skill indicator may be determined according to at least one skill attribute, so as to control the virtual camera to move in a range (for example, a connecting line between a center point of the current location of the first virtual character and a center point of the tail end of the skill indicator) between the current location of the first virtual character and the tail end of the skill indicator, so as to determine the adjustment position of the virtual camera. Then, an area shot by the virtual camera, that is, the scene display area in the game scene, is updated by controlling the movement of the virtual camera through the adjustment direction and the adjustment position.

Optionally, on the basis of steps S11 to S14, the following execution steps may be further included.

At step S15, a second touch operation acting on a preset position of the graphical user interface is detected.

At step S16, according to the second touch operation, the scene display area is controlled to restore to a state before performing the preset skill release operation.

The above second touch operation acting on the preset position of the graphical user interface has the function of canceling skill release and resetting the virtual camera. The second touch operation may be a touch operation acting on a specific cancellation control, or a touch operation acting on any blank area on the graphical interface, or an operation of sliding to a preset position before the first touch operation ends. Therefore, the second touch operation may be used for controlling the scene display area to restore to a display state before performing the preset skill release operation, or control the scene display area to restore to a display state calculated according to the presenting field calculation logic before performing the preset skill release operation.

In the present embodiment, the operation of controlling the scene display area to restore to the state before performing the preset skill release operation refers to that the first virtual character is controlled to move in the game scene according to the first touch operation acting on the first touch area, and the scene display area in the game scene is updated according to the position of the first virtual character in the game scene.

Optionally, on the basis of steps S11 to S14, the following execution steps may be further included.

At step S17, when the skill release operation ends, the scene display area is controlled to restore to a state before performing the preset skill release operation.

After the skill release operation is completed, contents rendered on the scene display area needs to be reset, that is, the scene display area is controlled to restore to the state before performing the preset skill release operation, which may be a touch operation acting on a specific reset control, or a touch operation acting on any blank area in the graphical interface, or an operation of sliding to a preset position when the skill release operation ends.

Optionally, at step S14, the operation that the scene display area in the game scene is updated at least according to the skill release direction corresponding to the preset skill release operation may include the following execution steps.

At step S1410, the skill release direction is determined according to an operation direction of the preset skill release operation.

At step S1411, the scene display area in the game scene is updated according to the skill release direction.

In an optional embodiment, when the operation direction of the preset skill release operation is from the current location of the first virtual character to the location of the enemy virtual character, the skill release direction may be determined according to whether the enemy virtual character is located in an effective attack range of a skill. When the enemy virtual character is located out of the effective attack range of the skill, the scene display area in the game scene may be updated by determining an update position or a shifting distance at any position in a range between the current location of the first virtual character and the tail end of the skill indicator. When the enemy virtual character is located in the effective attack range of skills, the scene display area in the game scene may be updated by determining an update position or a shifting distance at any position in a range between the current location of the first virtual character and the enemy virtual character.

Optionally, at step S14, the operation that the scene display area in the game scene is updated at least according to the skill release direction corresponding to the preset skill release operation may include the following execution steps.

At step S1412, a skill release position is determined according to an operation track of the preset skill release operation.

At step S1413, the skill release direction is determined according to the skill release position and the position of the first virtual character.

At step S1414, the scene display area in the game scene is updated according to the skill release direction.

If the skill indicator set during the skill release of the virtual character is, in a preset range centered by the current location of the first virtual character, a specific area displayed in the preset range independent of the virtual character, the skill release position is finally determined according to an operation track of the specific area. Then, the scene display area in the game scene may be updated by determining an update position or a shifting distance at any position between the skill release position and the position of the first virtual character.

Optionally, at step S14, the operation that the scene display area in the game scene is updated at least according to the skill release direction corresponding to the preset skill release operation may include the following execution steps.

At step S1415, a position of a second virtual character in a preset range of the first virtual range is acquired.

At step S1416, the skill release direction is determined according to the preset skill release operation, the position of the first virtual character and the position of the second virtual character.

At step S1417, the scene display area in the game scene is updated according to the skill release direction.

In an optional embodiment, when there is a specific skill in the first virtual character (for example, a skill of restricting a movement of an enemy virtual character or a skill of providing blood to ally virtual characters), the second virtual character is required to be located in the preset range of the first virtual character, otherwise the skills will not be released. At this time, for the specific skill, the current location of the first virtual character and the current location of the second virtual character need to be obtained at the same time. Then, the scene display area in the game scene may be updated by determining an update position or a shifting distance at any position in an area between the current location of the first virtual character and the current location of the second virtual character.

By combining the foregoing embodiments, the following technical effects can be achieved.

At one, the comprehensive optimization of the current mainstream lens solutions has made up for the shortcomings of fixed and rigid lens modes in the current mainstream MOBA mobile game lens solutions and reliance on frequent operations by game players, which makes the operation of game lenses more flexible and intelligent. In addition, it has favorable extensibility, and leaves more design space for changes such as new gameplay methods and new characters to make the lens solution of the game more diversified and customized.

At two, for intelligent and multi-section lens adjustment modes, according to differences of operating behaviors of game players and game situations where the game players are located, different ways of lens assistance are provided to meet the special needs of a game visual field, the fine adjustment operation of the lens is intelligentized, the operation burdens of the game players are reduced, and the game players can obtain current game information needed most in the most relaxed way, thereby improving the efficiency of game information transmission and providing the game players with a smoother game experience.

At three, game players and novice players with limited operation levels who are unable to use lens operations and receive battlefield information well can adapt to the game faster, and master game lens operation methods, and an intelligent solution is provided for a special lens operation, thereby reducing the learning cost of the game players, lowering the overall operation threshold of the game, and improving the coverage area of the corresponding user group of the game.

At four, the game players with high operation level are enabled to complete more fine game operations with the most convenient operations, thereby providing more room for improvement in the game skills of such game players, improving the game experience of such game players, and facilitating the retention of gamers at this level.

At five, as an overall optimization solution, it can adapt to the needs of game players at different levels and provide favorable conditions for the overall promotion and propagation of the game.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the related art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

In the present embodiment, an in-game display control apparatus is also provided, which is configured to implement the above embodiments and optional implementation manners, and the description thereof has been omitted. As used below, the term "component" may implement a combination of software and/or hardware of a predetermined function. Although the apparatus described in the following embodiments is optionally implemented by software, hardware or a combination of software and hardware is also possible and conceived.

Figure 5:
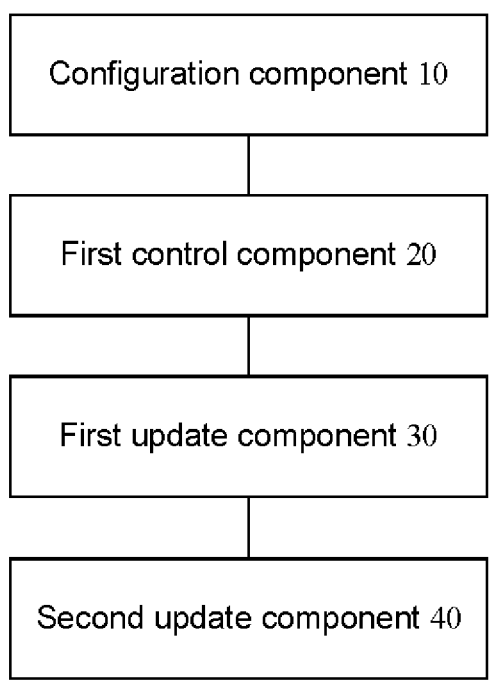
FIG. 5 is a structural block diagram of an in-game display control apparatus according to an embodiment of the present disclosure.

FIG. 5 is a structural block diagram of an in-game display control apparatus according to an embodiment of the present disclosure. As shown in FIG. 5, this apparatus is applied to a mobile terminal having at least one processor for executing a software application and a touch screen which is rendered with a graphical user interface, a game scene of a game includes a first virtual character and a scene display area, the scene display area is at least part of the game scene, and contents rendered on the graphical user interface includes the scene display area. The apparatus includes: a configuration component 10, configured to configure a first touch area and a second touch area on the graphical user interface; a control component 20, configured to, in response to a first touch operation acting on the first touch area, control a movement of the first virtual character in the game scene according to the first touch operation; a first update component 30, configured to update the scene display area in the game scene according to a position of the first virtual character in the game scene; and a second update component 40, configured to, in response to a preset skill release operation acting on the second touch area, update the scene display area in the game scene at least according to a skill release direction corresponding to the preset skill release operation.

Optionally, the second update component 40 is configured to determine an update direction of the scene display area in the game scene according to the skill release direction corresponding to the preset skill release operation, and update the scene display area in the game scene along the update direction.

Optionally, a virtual camera corresponding to the first virtual character is configured in the game scene, and the scene display area in the game scene is an area shot by the virtual camera.

Optionally, the second update component 40 includes: a first determination element (not shown in the figure), configured to determine an adjustment direction of the virtual camera according to the release direction; a first control element (not shown in the figure), configured to control a movement of the virtual camera according to the adjustment direction; and a first update element (not shown in the figure), configured to update the scene display area in the game scene according to the movement of the virtual camera.

Optionally, the second update component 40 is configured to update the scene display area in the game scene according to the skill release direction and at least one skill attribute corresponding to the preset skill release operation, the at least one skill attribute including a effect area of a skill release.

Optionally, the second update component 40 includes: a second determination element (not shown in the figure), configured to determine an adjustment direction of the virtual camera according to the release direction; a third determination element (not shown in the figure), configured to determine an adjustment position of the virtual camera according to the at least one skill attribute; a second control element (not shown in the figure), configured to control the movement of the virtual camera according to the adjustment direction and the adjustment position; and a second update element (not shown in the figure), configured to update the scene display area in the game scene according to the movement of the virtual camera.

Figure 6:
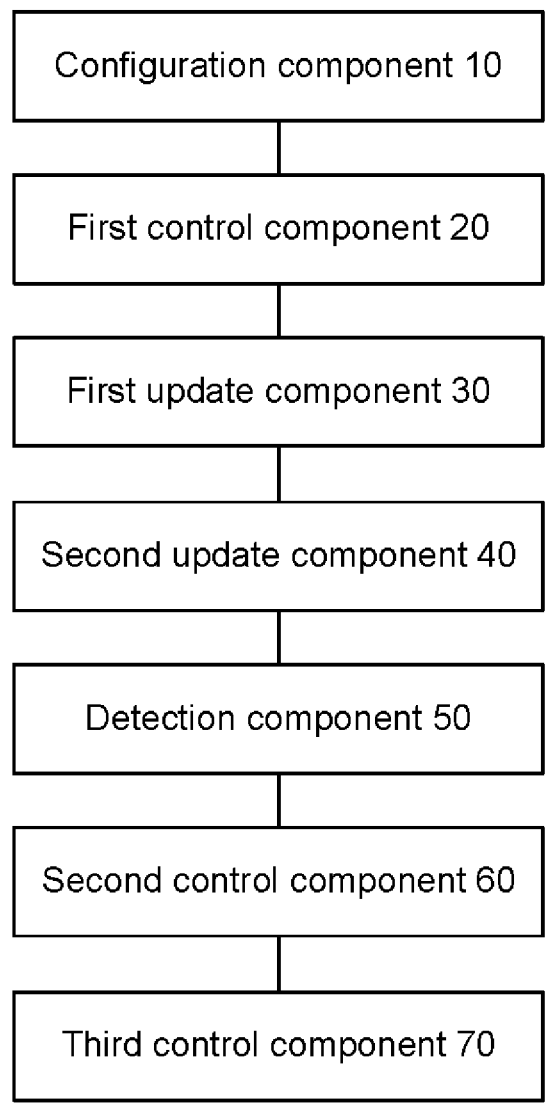
FIG. 6 is a structural block diagram of an in-game display control apparatus according to an optional embodiment of the present disclosure.

Optionally, FIG. 6 is a structural block diagram of an in-game display control apparatus according to an optional embodiment of the present disclosure. As shown in FIG. 6, in addition to all the components shown in FIG. 5, the apparatus further includes: a detection component 50, configured to detect a second touch operation acting on a preset position of the graphical user interface; and a second control component 60, configured to control, according to the second touch operation, the scene display area to restore to a state before performing the preset skill release operation.

Optionally, as shown in FIG. 6, the apparatus further includes: a third control component 70, configured to, when the skill release operation ends, control the scene display area to restore to a state before performing the preset skill release operation.

Optionally, the second update component 40 includes: a fourth determination element (not shown in the figure), configured to determine the skill release direction according to an operation direction of the preset skill release operation; and a third update element (not shown in the figure), configured to update the scene display area in the game scene according to the skill release direction.

Optionally, the second update component 40 includes: a fifth determination element (not shown in the figure), configured to determine a skill release position according to an operation track of the preset skill release operation; a sixth determination element (not shown in the figure), configured to determine the skill release direction according to the skill release position and the position of the first virtual character; and a fourth update element (not shown in the figure), configured to update the scene display area in the game scene according to the skill release direction.

Optionally, the second update component 40 includes: an acquisition element (not shown in the figure), configured to acquire a position of a second virtual character in a preset range of the first virtual range; a seventh determination element (not shown in the figure), configured to determine the skill release direction according to the preset skill release operation, the position of the first virtual character and the position of the second virtual character; and a fifth update element (not shown in the figure), configured to update the scene display area in the game scene according to the skill release direction.

It is to be noted that each of the above components may be implemented by software or hardware. The latter may be implemented by, but not limited to, the following manners: the above components are all located in the same processor; or, the above components are located in different processors respectively in any combined form.

Another embodiment of the present disclosure further provides a storage medium. The storage medium stores a computer program, where the computer program is configured to perform the steps in any one of the above method embodiments during running.

Optionally, in the present embodiment, the storage medium may be configured to store the computer program for performing the following steps.

At step S1, a first touch area and a second touch area are configured on the graphical user interface.

At step S2, in response to a first touch operation acting on the first touch area, a movement of the first virtual character in the game scene is controlled according to the first touch operation.

At step S3, the scene display area in the game scene is updated according to a position of the first virtual character in the game scene.

At step S4, in response to a preset skill release operation acting on the second touch area, the scene display area in the game scene is updated at least according to a skill release direction corresponding to the preset skill release operation.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

Another embodiment of the present disclosure further provides a processor. The processor is configured to run a computer program to perform the steps in any one of the above method embodiments.

Optionally, in the present embodiment, the processor may be configured to perform the following steps through the computer program.

At step S1, a first touch area and a second touch area are configured on the graphical user interface.

At step S2, in response to a first touch operation acting on the first touch area, a movement of the first virtual character in the game scene is controlled according to the first touch operation.

At step S3, the scene display area in the game scene is updated according to a position of the first virtual character in the game scene.

At step S4, in response to a preset skill release operation acting on the second touch area, the scene display area in the game scene is updated at least according to a skill release direction corresponding to the preset skill release operation.

Optionally, a specific example in the present embodiment may refer to the examples described in the above embodiments and optional implementation manners, and details are not described herein in the present embodiment.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into one processing element, or each element may exist physically separately, or at least two elements may be integrated into one element. The integrated element may be implemented in a hardware form and may also be implemented in form of software functional element.

The integrated element may be stored in a computer-readable storage medium when being implemented in the form of a software functional element and sold or used as a standalone product. Based on such understanding, the technical solution of the present disclosure, which is essential or contributes to the related art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementations of the present disclosure. It is to be noted that a number of modifications and refinements may be made by those of ordinary skill in the art without departing from the principles of the present disclosure, and such modifications and refinements are also considered to be within the scope of protection of the present disclosure.

What is claimed is:

1. An in-game display control method, applied to a mobile terminal having at least one processor for executing a software application and a touch screen which is rendered with a graphical user interface, a game scene of a game comprising a first virtual character and a scene display area, the scene display area being at least part of the game scene, contents rendered on the graphical user interface comprising the scene display area, the method comprising:
configuring a first touch area and a second touch area on the graphical user interface;
in response to a first touch operation acting on the first touch area, controlling a movement of the first virtual character in the game scene according to the first touch operation;
updating the scene display area in the game scene according to a position of the first virtual character in the game scene; and
in response to a preset skill release operation acting on the second touch area, updating the scene display area in the game scene at least according to a skill release direction corresponding to the preset skill release operation;
wherein a virtual camera corresponding to the first virtual character is configured in the game scene, and the scene display area in the game scene is an area shot by the virtual camera;
wherein updating the scene display area in the game scene at least according to the skill release direction corresponding to the preset skill release operation comprises: updating the scene display area in the game scene according to the skill release direction and at least one skill attribute corresponding to the preset skill release operation, the at least one skill attribute comprising an effect area of a skill release.

2. The method as claimed in claim 1, wherein updating the scene display area in the game scene at least according to the skill release direction corresponding to the preset skill release operation comprises:
determining an update direction of the scene display area in the game scene according to the skill release direction corresponding to the preset skill release operation, and updating the scene display area in the game scene along the update direction.

3. The method as claimed in claim 1, wherein updating the scene display area in the game scene at least according to the skill release direction corresponding to the preset skill release operation comprises:
determining an adjustment direction of the virtual camera according to the release direction;
controlling a movement of the virtual camera according to the adjustment direction; and
updating the scene display area in the game scene according to the movement of the virtual camera.

4. The method as claimed in claim 1, wherein updating the scene display area in the game scene at least according to the skill release direction and the at least one skill attribute corresponding to the preset skill release operation comprises:
determining an adjustment direction of the virtual camera according to the release direction;
determining an adjustment position of the virtual camera according to the at least one skill attribute;
controlling the movement of the virtual camera according to the adjustment direction and the adjustment position; and
updating the scene display area in the game scene according to the movement of the virtual camera.

5. The method as claimed in claim 1, further comprising:
detecting a second touch operation acting on a preset position of the graphical user interface; and controlling, according to the second touch operation, the scene display area to restore to a state before performing the preset skill release operation.

6. The method as claimed in claim 1, further comprising:
when the skill release operation ends, controlling the scene display area to restore to a state before performing the preset skill release operation.

7. The method as claimed in claim 1, wherein updating the scene display area in the game scene at least according to the skill release direction corresponding to the preset skill release operation comprises:
determining the skill release direction according to an operation direction of the preset skill release operation; and
updating the scene display area in the game scene according to the skill release direction.

8. The method as claimed in claim 1, wherein updating the scene display area in the game scene at least according to the skill release direction corresponding to the preset skill release operation comprises:
determining a skill release position according to an operation track of the preset skill release operation;
determining the skill release direction according to the skill release position and the position of the first virtual character; and
updating the scene display area in the game scene according to the skill release direction.

9. The method as claimed in claim 1, wherein updating the scene display area in the game scene at least according to the skill release direction corresponding to the preset skill release operation comprises:

acquiring a position of a second virtual character in a preset range of the first virtual range;

determining the skill release direction according to the preset skill release operation, the position of the first virtual character and the position of the second virtual character; and updating the scene display area in the game scene according to the skill release direction.

10. An in-game display control apparatus, applied to a mobile terminal having at least one processor for executing a software application and a touch screen which is rendered with a graphical user interface, a game scene of a game comprising a first virtual character and a scene display area, the scene display area being at least part of the game scene, contents rendered on the graphical user interface comprising the scene display area, the apparatus comprising:

a configuration component, configured to configure a first touch area and a second touch area on the graphical user interface;

a control component, configured to, in response to a first touch operation acting on the first touch area, control a movement of the first virtual character in the game scene according to the first touch operation;

a first update component, configured to update the scene display area in the game scene according to a position of the first virtual character in the game scene; and a second update component, configured to, in response to a preset skill release operation acting on the second touch area, update the scene display area in the game scene at least according to a skill release direction corresponding to the preset skill release operation;

wherein a virtual camera corresponding to the first virtual character is configured in the game scene, and the scene display area in the game scene is an area shot by the virtual camera;

wherein the second update component is further configured to update the scene display area in the game scene according to the skill release direction and at least one skill attribute corresponding to the preset skill release operation, the at least one skill attribute comprising an effect area of a skill release.

11. A non-transitory storage medium, comprising a stored program, wherein when the stored program is run, a device where the storage medium is located is controlled to perform the in-game display control method as claimed in claim 1.

12. A processor, configured to run a program, wherein the program is run to perform the in-game display control method as claimed in claim 1.

13. A terminal, comprising: at least one processor, a memory, a display device, and at least one program, wherein the at least one program is stored in the memory, and configured to be run by the at least one processor, the at least one program being configured to perform the in-game display control method as claimed in claim 1.

14. The method as claimed in claim 1, wherein the first touch area is a direction control located on a lower left area of the graphical user interface, and the second touch area is a skill control located on a lower right area of the graphical user interface.

15. The method as claimed in claim 3, wherein according to the adjustment direction, the virtual camera is controlled to move along the skill release direction from a current location of the first virtual character.

16. The method as claimed in claim 5, wherein the second touch operation comprises one of the followings:

a touch operation acting on a specific cancellation control;

a touch operation acting on any blank area on the graphical interface; and an operation of sliding to a preset position before the first touch operation ends.

17. The method as claimed in claim 8, wherein the scene display area in the game scene is updated by determining an update position or a shifting distance at any position between the skill release position and the position of the first virtual character.

18. The method as claimed in claim 8, wherein the scene display area in the game scene is updated by determining an update position or a shifting distance at any position in an area between the current location of the first virtual character and the current location of the second virtual character.

* * * * *